(12) United States Patent
Simon et al.

(10) Patent No.: US 8,191,953 B2
(45) Date of Patent: Jun. 5, 2012

(54) INTEGRATED INERTIAL LOCK AND LATCH FOR CONSOLE LID

(75) Inventors: Scott Simon, Shelby Township, MI (US); Raymond A. Oldani, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 12/829,695

(22) Filed: Jul. 2, 2010

(65) Prior Publication Data
US 2012/0001447 A1 Jan. 5, 2012

(51) Int. Cl.
*B60R 7/04* (2006.01)
(52) U.S. Cl. ............... 296/24.34; 296/1.04; 292/DIG. 22
(58) Field of Classification Search ............... 296/24.43, 296/37.1, 37.8, 37.12, 1.04, 24.34; 292/252, 292/27, 37, 215, DIG. 22
See application file for complete search history.

(56) References Cited

U.S. PATENT DOCUMENTS

| | | | | |
|---|---|---|---|---|
| 4,039,158 A | * | 8/1977 | Weman | 242/384.4 |
| 4,898,033 A | * | 2/1990 | Yamamoto | 73/514.01 |
| 5,067,625 A | | 11/1991 | Numata | |
| 5,267,761 A | | 12/1993 | Curtindale et al. | |
| 5,388,901 A | * | 2/1995 | Asano | 312/222 |
| 5,971,463 A | * | 10/1999 | Nowak et al. | 296/37.8 |
| 6,471,262 B1 | * | 10/2002 | Schwab | 292/336.3 |
| 6,612,628 B1 | * | 9/2003 | Herbst | 292/263 |
| 6,789,831 B2 | * | 9/2004 | Schmidt et al. | 296/37.13 |
| 6,802,550 B1 | | 10/2004 | Griggs, Jr. et al. | |
| 6,808,214 B2 | * | 10/2004 | Sato et al. | 292/341.15 |
| 7,064,285 B2 | | 6/2006 | Ichimaru | |
| 7,198,307 B2 | * | 4/2007 | Drysdale et al. | 292/216 |
| 7,571,948 B2 | * | 8/2009 | Suh | 296/37.12 |
| 7,607,727 B2 | * | 10/2009 | Park | 297/188.19 |
| 7,669,288 B2 | * | 3/2010 | Zeilbeck et al. | 16/354 |
| 7,686,355 B2 | * | 3/2010 | Jankowski et al. | 292/336.3 |
| 7,959,202 B2 | * | 6/2011 | Ahn | 296/37.8 |
| 2002/0121784 A1 | * | 9/2002 | Chevalier | 292/201 |
| 2004/0046400 A1 | * | 3/2004 | Drysdale et al. | 292/216 |
| 2004/0070213 A1 | * | 4/2004 | Vitry | 292/110 |

(Continued)

FOREIGN PATENT DOCUMENTS
EP 0525811 A1 3/1993
(Continued)

*Primary Examiner* — Jason S Morrow
(74) *Attorney, Agent, or Firm* — Gregory P. Brown; MacMillian Sobanski & Todd, LLC

(57) ABSTRACT

A vehicular console storage system has a pivotable lid and a striker movable with the lid. A pawl is mounted in a fixed location for selectably receiving the striker, wherein the pawl is movable between a latching position and a release position. The pawl holds the striker so that the lid is held closed when in the latching position, and the pawl has a cam surface. A spring-loaded cam follower is at least in partial contact with the cam surface and is movable between an extended position and a retracted position to provide a first resistance to motion of the pawl from the latching position to the release position. The first resistance is easily overcome by manual manipulation by a user. A movable lever has an activated position and a deactivated position, wherein the activated position interferes with movement of the pawl from the latching position to the release position. An inertial sensor is provided for moving the movable lever to the activated position in response to a predetermined acceleration. Thus, an integrated mechanism provides both hard locking during a crash event and soft latching for easy user access without requiring a manually operated button or latch.

6 Claims, 4 Drawing Sheets

U.S. PATENT DOCUMENTS

| | | | |
|---|---|---|---|
| 2006/0261603 A1* | 11/2006 | Cetnar et al. | 292/216 |
| 2007/0018474 A1* | 1/2007 | Jeon | 296/37.8 |
| 2007/0085349 A1* | 4/2007 | Merideth et al. | 292/183 |
| 2007/0096487 A1* | 5/2007 | Woerner | 296/37.1 |
| 2007/0158967 A1* | 7/2007 | Ehrenberger et al. | 296/24.43 |
| 2007/0246963 A1* | 10/2007 | Thomas | 296/37.8 |
| 2007/0278812 A1* | 12/2007 | Miller et al. | 296/37.12 |
| 2008/0217457 A1* | 9/2008 | Clute et al. | 242/383.2 |
| 2009/0008962 A1* | 1/2009 | Sauer et al. | 296/187.03 |
| 2009/0108609 A1* | 4/2009 | Hirai et al. | 296/37.16 |
| 2009/0152886 A1* | 6/2009 | Lee | 296/37.8 |
| 2009/0206625 A1* | 8/2009 | Toppani et al. | 296/37.12 |
| 2009/0218842 A1* | 9/2009 | Muller | 296/37.13 |
| 2010/0001539 A1* | 1/2010 | Kikuchi et al. | 292/138 |
| 2011/0133506 A1* | 6/2011 | Woo | 296/37.8 |
| 2011/0175376 A1* | 7/2011 | Whitens et al. | 292/251.5 |

FOREIGN PATENT DOCUMENTS

| | | |
|---|---|---|
| JP | 2001151022 | 6/2001 |
| WO | WO0050715 | 8/2000 |

* cited by examiner

INTEGRATED INERTIAL LOCK AND LATCH FOR CONSOLE LID

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to storage bins in automotive consoles with pivotable lids, and, more specifically, to a mechanism for locking down the lid during an acceleration event such as a crash.

Many automotive vehicles utilize storage bins in a console or other areas of a vehicle interior. A pivotable lid typically covers the storage compartment and may double as an armrest. To meet safety concerns and various regulatory requirements, it is necessary for the door to stay closed during a crash so that any stored contents do not become projectiles moving within the vehicle interior. Crash retention of the lid in a closed position has been achieved by using a manually operated lever or push button to operate a latch whenever it is desired to open the lid wherein the closed latch is made to withstand the crash forces. However, for styling and convenience purposes it may be desirable to eliminate such a manually operated push button or lever. Thus, console systems are known that use an automatic locking of the lid based on sensing of high accelerations during a crash event.

When an automatic means is used for locking the lid during a crash event, a separate latching function is still desirable in order to clamp the lid closed during non-crash events because of lid flutter or rattles that could occur during normal vehicle operation. Thus, the lid requires a soft locking feature providing easy user access during normal operation as well as a hard locking function during a crash event to maintain the lid in a closed position. Preferably, the soft locking function can be obtained without requiring a manually operated button or latch.

SUMMARY OF THE INVENTION

In one aspect of the invention, a console storage system is provided for a vehicle comprising a pivotable lid and a striker movable with the lid. A pawl is mounted in a fixed location for selectably receiving the striker, wherein the pawl is movable between a latching position and a release position. The pawl holds the striker so that the lid is held closed when in the latching position, and the pawl has a cam surface. A spring-loaded cam follower is at least in partial contact with the cam surface and is movable between an extended position and a retracted position to provide a first resistance to motion of the pawl from the latching position to the release position. The first resistance is easily overcome by manual manipulation by a user. A movable lever has an activated position and a deactivated position, wherein the activated position interferes with movement of the pawl from the latching position to the release position. An inertial sensor is provided for moving the movable lever to the activated position in response to a predetermined acceleration.

DETAILED DESCRIPTION OF PREFERRED EMBODIMENTS

Figure 1:
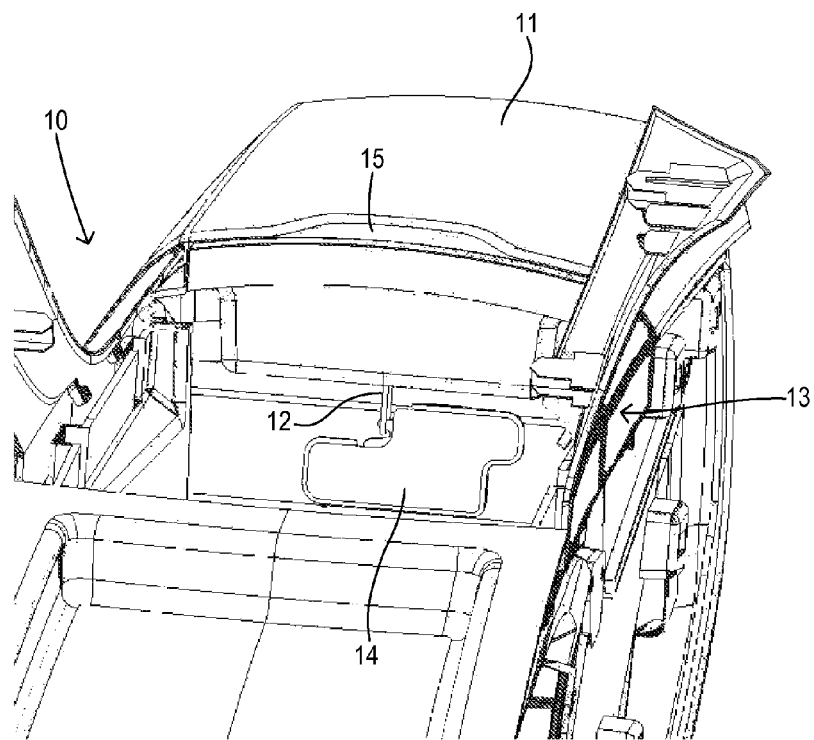
FIG. 1 is a partially cut-away, perspective view of a console storage system according to one embodiment of the invention.

Referring to FIG. 1, a console system 10 for mounting between the front seats in a vehicle has a pivotable lid 11 from which a striker 12 extends. A storage enclosure beneath lid 11 includes a frame 13 onto which a pawl housing 14 is fixedly mounted. A slot (not shown) in the body of console 10 receives striker 12 when lid 11 is closed so that it can be engaged by a pawl within pawl housing 14. Lid 11 may have a hand grip 15 to assist a user in lifting lid 11 to its open position.

Figure 2:
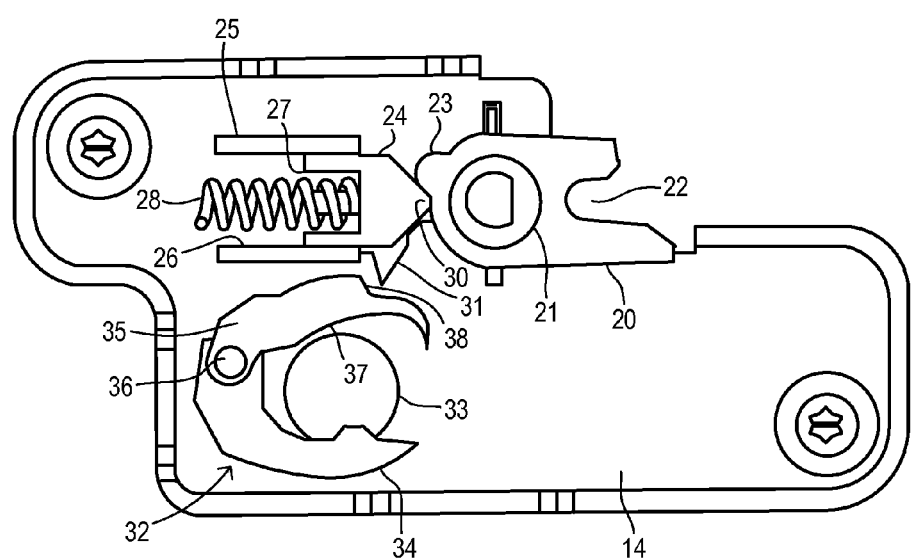
FIG. 2 is a plan view of a pawl system according to one preferred embodiment.

FIG. 2 shows a pawl assembly within pawl housing 14 including a pawl 20 rotatable about a pivot pin 21. Pawl 20 has a recess 22 for receiving striker 12 and a cam surface 23 with an increasing radial extension from pivot pin 21 for being juxtaposed with and for interacting with a spring-loaded cam follower 24.

Cam follower 24 slides along a pair of guides 25 and 26 and has a cup 27 for receiving one end of a spring 28. The other end of spring 28 is fixed to housing 14 so that an abutting end 30 of cam follower 24 is urged against pawl 20 with a desired force. When pawl 20 rotates in a counterclockwise direction from the position shown in FIG. 2, cam surface 23 interferes with abutting end 30 of cam follower 24 to displace cam follower 24 to the left thereby compressing spring 28. The amount of force required is selected to be easily produced by manually pulling on the lid while being large enough to hold down the lid in a closed position such that lid flutter and rattle are prevented.

Figure 3:
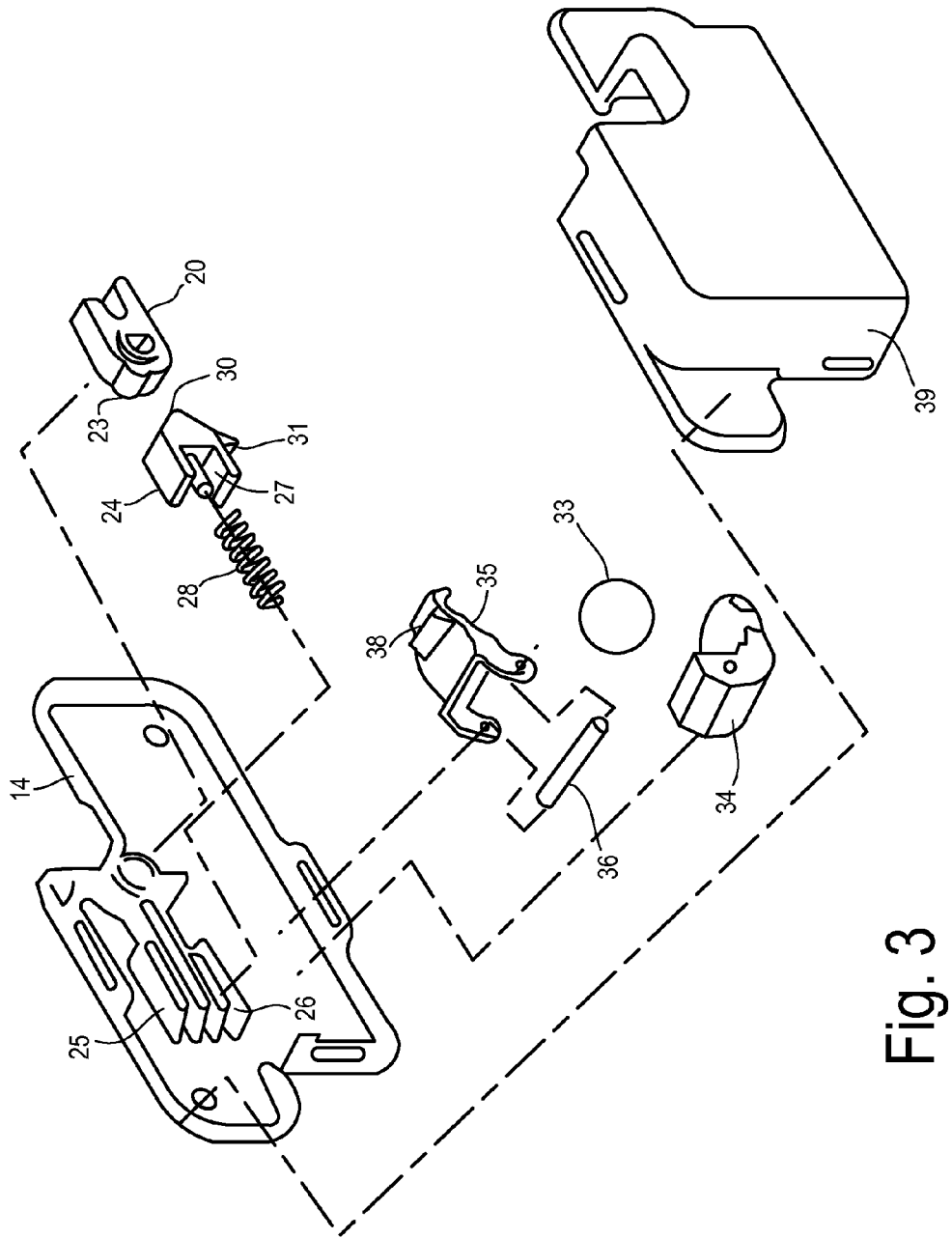
FIG. 3 is an exploded view of the pawl system of FIG. 2.

Cam follower 24 also includes a stop feature 31 that may be engaged by an inertial sensor 32 for preventing the leftward movement of cam follower 24 during an acceleration event detected by inertial sensor 32. A spherical mass 33 is retained between a lower housing 34 and an upper housing 35. Housing 34 is fixed and has a cup-shaped recess for receiving mass 33. Upper housing 35 is hinged about a pivot 36 and has a bottom surface 37 that interacts with mass 33 during an acceleration such as a crash. The interaction with mass 33 when there is an acceleration above a predetermined acceleration causes housing 35 to rise so that a stop feature 38 move into an interfering position with stop feature 31. The exploded view in FIG. 3 shows a housing cover 39 that mates with housing 14.

Figure 4:
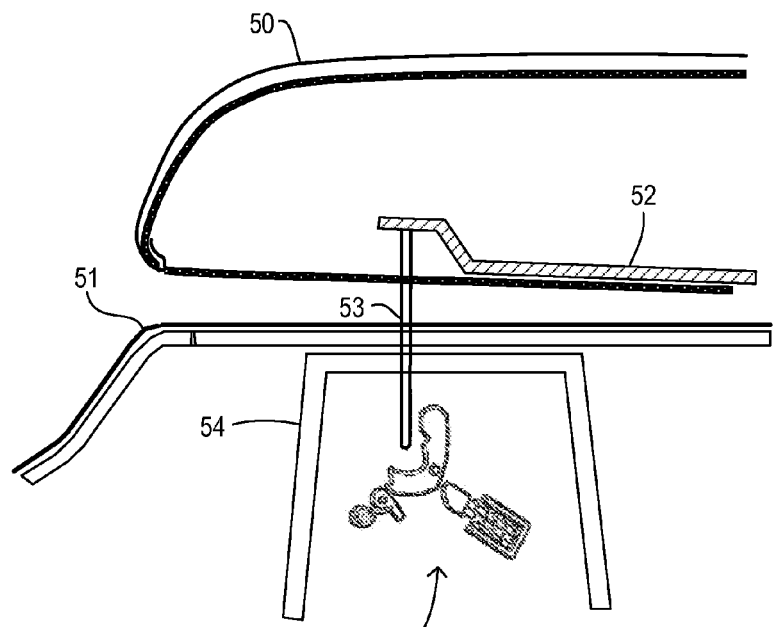
FIG. 4 is a side diagrammatic view of an alternative embodiment.

FIG. 4 shows an alternative embodiment wherein a pivotable lid 50 can be raised and lowered with respect to a console base 51. A lid frame 52 is connected to a striker 53 that passes through console base 51 and a latch housing 54 to a latch mechanism 55. Latch mechanism 55, shown in greater detail in FIG. 5, includes a pawl 56 that pivots about a pivot pin 57. Striker 53 can be received in a notch 58 on pawl 56 for latching the striker in a closed position. Pawl 56 has a latching position shown in solid lines and a release position show in dashed lines. A cam surface 60 on pawl 56 is in at least partial contact with a spring-loaded cam follower 61 slideably mounted on a post 62 and loaded into an extended position by a spring 63. Spring 63 is held in place by a mounting cup 64. The opening and closing effort associated with moving the lid can be tuned accurately by adjusting the spring rate of spring 63 and the cam follower profile.

Figure 5:
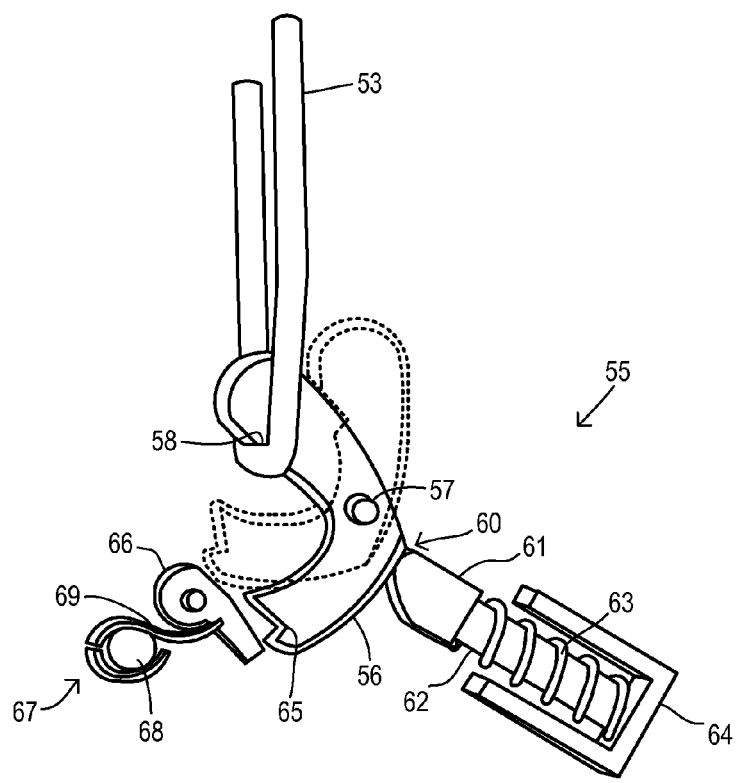
FIG. 5 is a side view showing the pawl system of FIG. 4 in greater detail.

In order to prevent lid opening during a crash event, a notch 65 is provided on one end of pawl 56. A movable lever 66 is rotatable between an activated position and a deactivated position. The activated position interferes with movement of pawl 56 by moving into notch 65 when a predetermined acceleration is detected by an inertial sensor 67. As shown in FIG. 5, inertial sensor 67 may be comprised of a standing man sensor having a moving mass 68 and a projection arm 69 that can push against movable lever 66 to rotate it into its activated position. Thus, in the embodiment of FIGS. 4 and 5, the stop feature is located on the pawl instead of on the cam follower as in FIG. 2.

Figure 6:
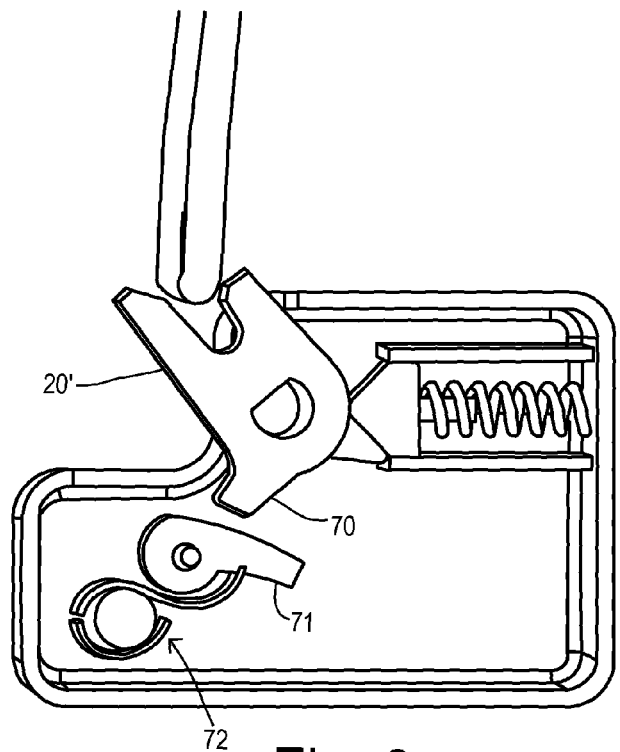
FIGS. 6 and 7 are side plan views of another alternative embodiment in an unlatched condition and a latched condition, respectively.
Figure 7:
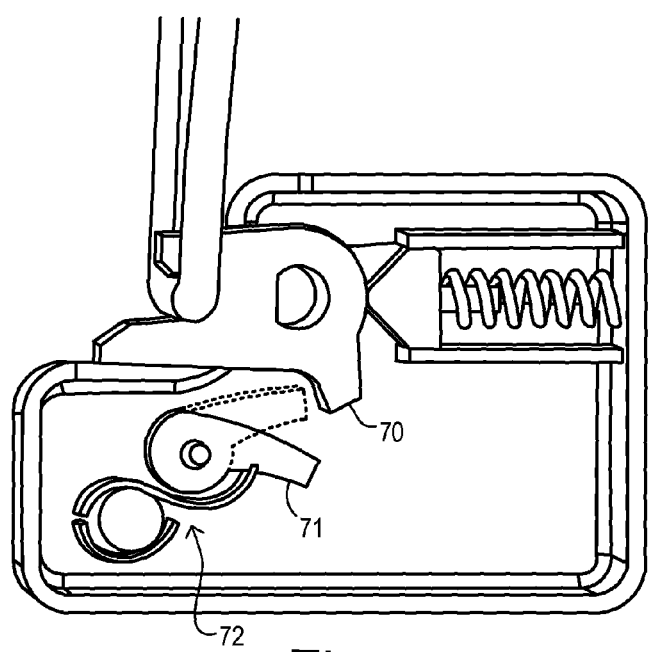

FIGS. 6 and 7 show a further embodiment wherein a pawl 20' has a stop feature 70 that may be juxtaposed with movable lever 71. As shown by dashed lines in FIG. 7, movable lever 71 becomes juxtaposed against stop feature 70 when it is moved into its activated position by an inertial sensor 72.

The present invention has provided an integrated mechanism achieving control of the opening and closing effort of a user while providing hard locking of the lid under crash conditions. A latch assembly is preferably installed at the center line of a console lid and concealed in the console body. The only features visible to a user are the striker emanating from the console lid and a slot in the console body aligned such that the striker enters and engages the latch assembly in a pawl housing upon closing of the lid.

What is claimed is:

1. A console storage system for a vehicle, comprising:
a pivotable lid;
a striker movable with the lid;
a pawl mounted in a fixed location for selectably receiving the striker, wherein the pawl is movable between a latching position and a release position, wherein the pawl holds the striker so that the lid is held closed when in the latching position, and wherein the pawl has a cam surface;
a spring-loaded cam follower at least in partial contact with the cam surface and movable between an extended position and a retracted position to provide a first resistance to motion of the pawl from the latching position to the release position, wherein the first resistance is easily overcome by manual manipulation by a user;
a movable lever having an activated position and a deactivated position, wherein the activated position interferes with movement of the pawl from the latching position to the release position; and
an inertial sensor for moving the movable lever to the activated position in response to a predetermined acceleration.

2. The system of claim 1 wherein the movable lever is juxtaposed to the cam follower so that when the movable lever is in the activated position it locks the cam follower in the extended position.

3. The system of claim 1 wherein the pawl has a stop feature, and wherein the movable lever is juxtaposed to the stop feature so that when the movable lever is in the activated position it locks the pawl in the latching position.

4. The system of claim 1 wherein the inertial sensor is comprised of a moving mass and a projection arm.

5. The system of claim 1 further comprising:
a storage enclosure which is covered by the pivotable lid; and
a pawl housing into which the pawl, cam follower, movable lever, and inertial sensor are assembled, wherein the housing is fixedly mounted to the storage enclosure.

6. Apparatus receiving a console lid striker, comprising:
a pawl with a cam surface movable between latching and release positions;
a cam follower with extended and retracted positions providing a resistance to motion of the pawl easily overcome by manipulating the lid;
a movable lever with an activated position that interferes with pawl movement into the release position; and
an inertial sensor moving the lever to the activated position in response to a predetermined acceleration.

\* \* \* \* \*